(12) United States Patent
Beck et al.

(10) Patent No.: US 12,042,767 B2
(45) Date of Patent: Jul. 23, 2024

(54) APPARATUS AND PROCESS FOR PRODUCING A FILTER ELEMENT

(71) Applicant: GAMBRO LUNDIA AB, Lund (SE)

(72) Inventors: Christof Beck, Bitz (DE); Rainer Blickle, Bitz (DE); Stefan Ermantraut, Balingen (DE); Bernd Hertzler, Balingen (DE); Steffen Wagner, Messstetten (DE)

(73) Assignee: GAMBRO LUNDIA AB, Lund (SE)

( * ) Notice: Subject to any disclaimer, the term of this patent is extended or adjusted under 35 U.S.C. 154(b) by 201 days.

(21) Appl. No.: 17/788,066

(22) PCT Filed: Dec. 29, 2020

(86) PCT No.: PCT/EP2020/087959
§ 371 (c)(1),
(2) Date: Jun. 22, 2022

(87) PCT Pub. No.: WO2021/136768
PCT Pub. Date: Jul. 8, 2021

(65) Prior Publication Data
US 2023/0039445 A1    Feb. 9, 2023

(30) Foreign Application Priority Data
Dec. 31, 2019  (EP) ..................... 19220173

(51) Int. Cl.
*B01D 63/02*   (2006.01)
*B29C 65/18*   (2006.01)
*B29C 65/78*   (2006.01)
*B29L 31/14*   (2006.01)

(52) U.S. Cl.
CPC ............ *B01D 63/021* (2013.01); *B29C 65/18* (2013.01); *B29C 65/7847* (2013.01); *B29C 65/7876* (2013.01); *B01D 2313/56* (2013.01); *B01D 2323/42* (2013.01); *B29L 2031/14* (2013.01)

(58) Field of Classification Search
CPC ... B10D 63/021; B29C 65/18; B29C 65/7847; B29C 65/7876; B29C 66/53465
See application file for complete search history.

(56) References Cited

U.S. PATENT DOCUMENTS

2020/0047127 A1    2/2020   Huang et al.

FOREIGN PATENT DOCUMENTS

| CN | 108993160 | 12/2018 | |
|---|---|---|---|
| EP | 3388141 | 10/2018 | |
| JP | 66039304 | 3/1985 | |
| WO | WO2019018200 | 1/2019 | |
| WO | WO-2019018200 A1 * | 1/2019 | ................ A61J 1/10 |

OTHER PUBLICATIONS

PCT Search Report and Written Opinion prepared for PCT Application No. PCT/EP2020/087959, completed Mar. 29, 2021.

* cited by examiner

*Primary Examiner* — Daniel McNally
(74) *Attorney, Agent, or Firm* — Barnes & Thornburg LLP

(57) ABSTRACT

The present disclosure relates to an apparatus used in the production of a sterilizing filter for dead-end filtration of medical liquids which comprises a plurality of microporous hollow fiber membranes having a large inner diameter, and to a process for operating the apparatus.

15 Claims, 3 Drawing Sheets

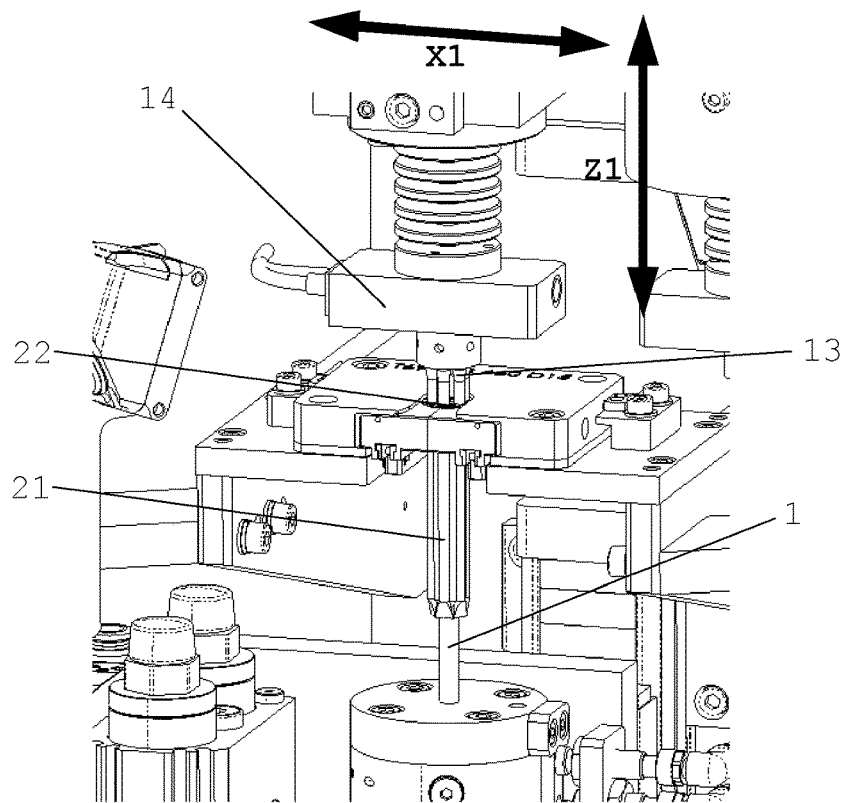
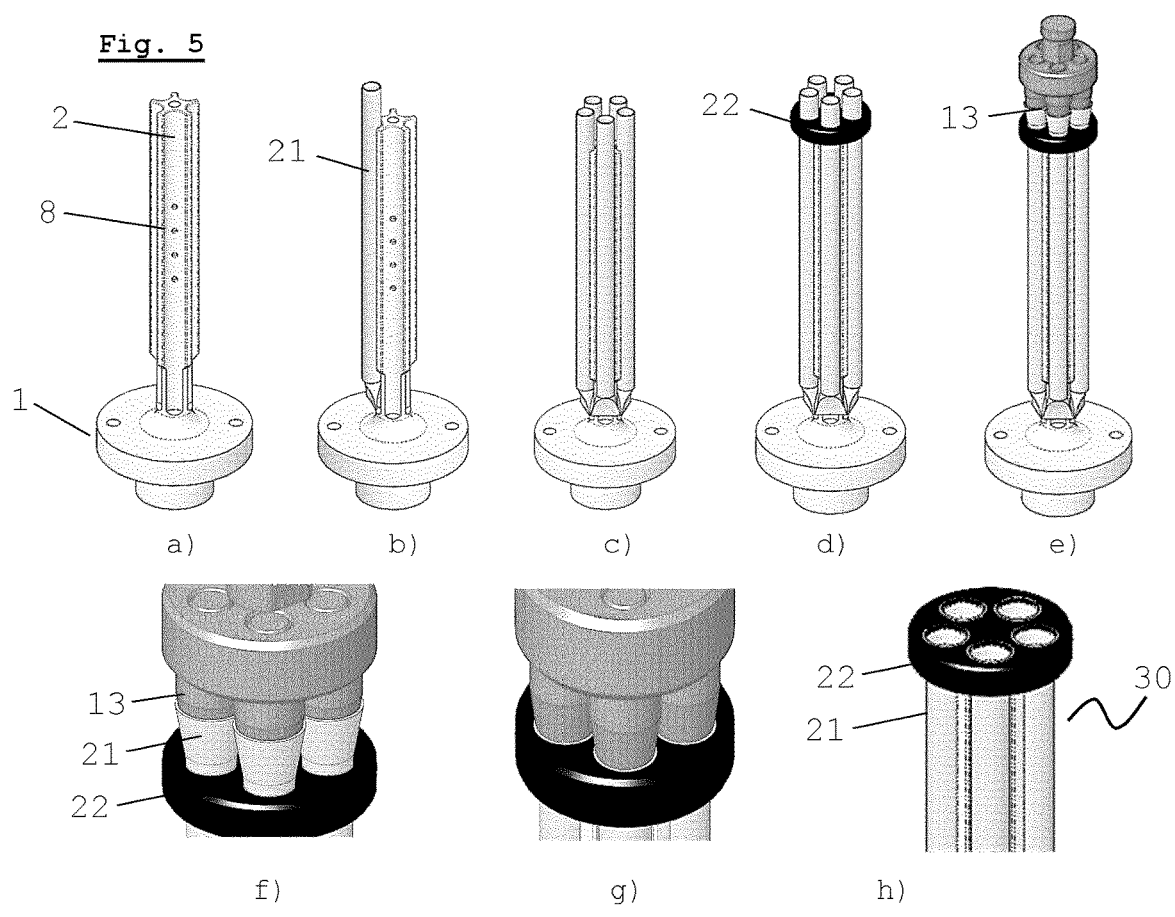
Fig. 5
Fig. 6

APPARATUS AND PROCESS FOR PRODUCING A FILTER ELEMENT

CROSS-REFERENCE TO RELATED APPLICATIONS

This application is a national stage entry under 35 U.S.C. § 371(b) of PCT International Application No. PCT/EP2020/087959, filed Dec. 29, 2020, which claims the benefit of European Patent Application Serial No. 19220173.9, filed on Dec. 31, 2019, the entire disclosures of both of which are incorporated herein by reference.

TECHNICAL FIELD

The present disclosure relates to an apparatus used in the production of a sterilizing filter for dead-end filtration of medical liquids which comprises a plurality of microporous hollow fiber membranes having a large inner diameter, and to a process for operating the apparatus.

DESCRIPTION OF THE RELATED ART

Liquids destined to be infused into a patient's body, in particular into the bloodstream of a patient, have to be free of pyrogens and particulate matter. To protect the patient, infusion solutions therefore typically are passed through a filter device installed in the infusion line before they enter the patient's body. Commercially available devices generally comprise a microporous flat sheet membrane. Filter devices comprising hollow fiber membranes instead of flat sheet membranes also have been proposed.

WO 2019/018200 A1 discloses a medical product including a bladder, a filtration device, and a sterile product concentrate. The bladder has a perimeter seal and defines a sterile chamber. The filtration device includes a stem and a filter membrane disposed in line with the stem. The stem extends through the perimeter seal and has an inlet end accessible from outside of the perimeter seal and an outlet end in fluid communication with the sterile chamber. The filter membrane can have a nominal pore size in a range of approximately 0.1 µm to approximately 0.5 µm, wherein the filter membrane is shaped as a hollow fiber with a wall and pores residing in the wall of the fiber.

CN 108 993 160 A relates to an automatic manipulating device for hollow fiber membrane filaments. The automatic manipulating device comprises a first membrane filament traction machine, a membrane filament support assembly used for fixing membrane filaments, and a second membrane filament traction machine which are successively arranged, wherein the membrane filament support assembly comprises a first membrane filament support and a second membrane filament support which respectively have an opened upper part; the first membrane filament traction machine, the first membrane filament support, the second membrane filament support and the second membrane filament traction machine are respectively provided with membrane filament holes matching with the membrane filaments; and the automatic manipulating device also comprises a membrane filament grasping mechanism, a first driving mechanism, a shearing mechanism and a potting mechanism.

JP S60 39304 U discloses an apparatus comprising at least two fingers, each finger having a hollow fiber bundle holding piece at the tip thereof for sandwiching a hollow fiber bundle formed by bundling a plurality of hollow fibers.

EP 3 405 277 A1, EP 3 431 171 A1 and EP 3 388 141 A1 disclose semipermeable hollow fiber membranes having a large inner diameter and comparatively thin walls, as well as sterilizing filters for dead-end filtration of medical liquids comprising these semipermeable hollow fiber membranes.

Due to their large inner diameter and the comparatively thin wall, these hollow fiber membranes are easily damaged by mechanical stress and require particular care during processing.

SUMMARY

The present disclosure provides an apparatus and a process for producing a filter element of a sterilizing filter for medical liquids, e.g., water. The sterilizing filter is configured for dead-end filtration and comprises a plurality of microporous hollow fiber membranes having a large inner diameter.

BRIEF DESCRIPTION OF THE DRAWINGS

FIG. 5 is a schematic perspective view of the apparatus of FIG. 3 in a third position;

FIG. 6 shows a picker arm of an embodiment of the apparatus of the present disclosure in several stages of the process of the present disclosure.

DETAILED DESCRIPTION

Figure 1:
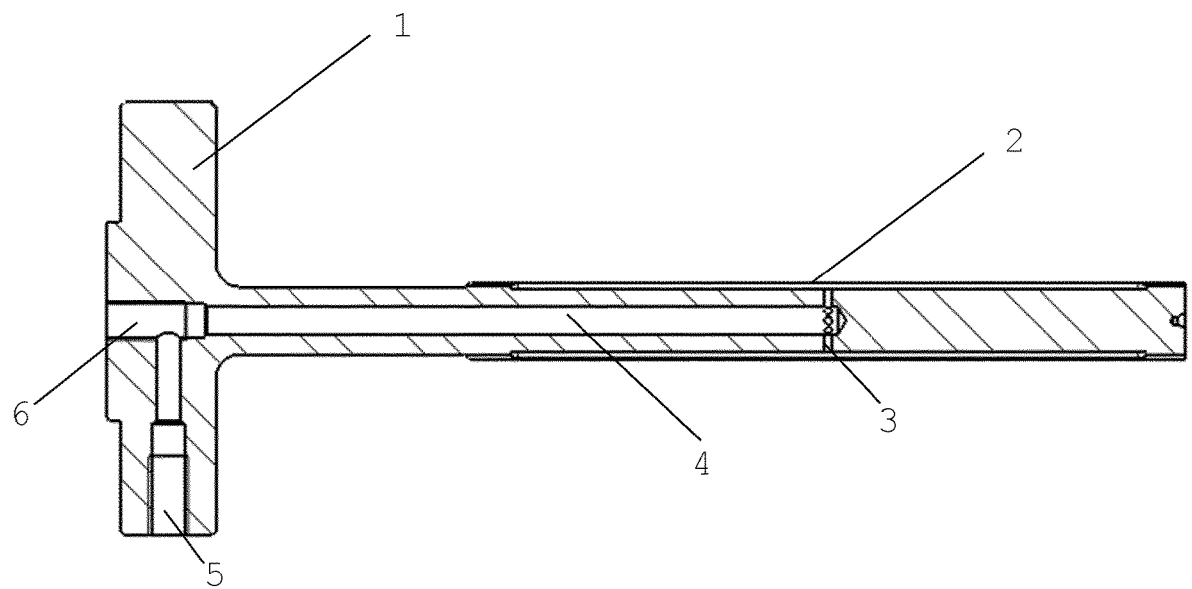
FIG. 1 is a schematic longitudinal-sectional view of an embodiment of a picker arm of the apparatus of the present disclosure.

The present invention provides an apparatus and a process for producing a filter element of a sterilizing filter for medical liquids, e.g., water. The sterilizing filter is configured for dead-end filtration and comprises a plurality of microporous hollow fiber membranes having a large inner diameter. The liquid flows from the lumen of the hollow fiber membranes to the outside of the hollow fiber membranes and is filtered through the microporous wall of the hollow fiber membranes. Such a filter element can comprise a different number of fibers and the length of the hollow fiber membranes can be varied. This allows for tuning the effective membrane surface of the filter element to the requirements of the respective filtration process.

The apparatus of the present invention is configured to transfer a number of hollow fiber membranes into bores of a disc comprised of a thermoplastic material and to weld the fibers to the wall of the bores using heat and pressure.

In the filter element of the present disclosure, the hollow fiber membranes are heat-welded to the walls of bores in a disc comprised of a thermoplastic material. The disc separates the individual hollow fiber membranes from each other and also separates the compartment containing the unfiltered liquid from the compartment containing the filtered liquid in the finished sterilizing filter.

Suitable thermoplastic materials for the disc are known in principle to the person skilled in the art and described in EP 3 388 141 A1. In one embodiment, the thermoplastic material is polycarbonate. In another embodiment, the thermoplastic material is PETG.

The number of fibers in the filter element can vary. In one embodiment, the filter element comprises at least two hollow fiber membranes, for instance, 2 to 12 hollow fiber membranes, or 4 to 10 hollow fiber membranes, or even 5 to 8 hollow fiber membranes. In an exemplary embodiment shown in the accompanying figures, the filter element comprises six fibers, and the disc of thermoplastic material which holds the fibers also is equipped with six bores.

The microporous hollow fiber membranes having a large inner diameter and thin walls, such as the hollow fiber membranes taught in EP 3 405 277 A1 and EP 3 431 171 A1.

In one embodiment, the microporous hollow fiber membranes have an inner diameter of from 2.8 to 4.0 mm, for instance, from 3.0 to 3.7 mm, or from 3.1 to 3.5 mm; and a wall thickness of from 100 to 500 µm, for instance, from 180 to 320 µm. The outer diameter of the microporous hollow fiber membranes is larger than 3 mm and smaller than 4.5 mm. In one embodiment, the ratio of inner diameter to wall thickness of the membranes is larger than 10, or even larger than 15.

In one embodiment, the microporous hollow fiber membranes have a mean flow pore size, determined by capillary flow porometry, in the range of from 0.2 to 0.5 µm.

Capillary flow porometry is a liquid extrusion technique in which the flow rates through wet and dry membranes at differential gas pressure are measured. Before measurement, the membrane is immersed in a low surface tension liquid (e.g., a perfluoroether commercially available under the trade name Porofil®) to ensure that all pores including the small ones are filled with the wetting liquid. By measuring the pressure at which the liquid is pressed out of the pores their corresponding diameter can be calculated using the Laplace equation. With this method, the pore size distribution of those pores that are active in the mass transport is determined. Dead-end and isolated pores are omitted. The hollow fiber membranes are measured inside-out.

Laplace equation: $Dp = 4 \gamma \cos \theta / \Delta P$
$Dp$=diameter of pores [m]
$\gamma$=surface tension [N/m]; for Porofil® 0.016 [N/m]
$\Delta P$=pressure [Pa]
$\cos \theta$=contact angle; for complete wetting $\cos \theta = 1$ In one embodiment, the microporous hollow fiber membranes comprise polyethersulfone (PESU) and polyvinylpyrrolidone (PVP). In one embodiment, the microporous hollow fiber membranes additionally comprise a polymer bearing cationic charges. Examples of suitable polymers bearing cationic charges include polyethyleneimines, modified polyethyleneimines, and modified polyphenyleneoxides.

In one embodiment, the hollow fiber membranes are produced by a continuous solvent phase inversion spinning process comprising extruding a polymer solution through an outer ring slit of a nozzle with two concentric openings into a precipitation bath while simultaneously extruding a center fluid through the inner opening of the nozzle; subsequently washing the membrane obtained; cutting the membrane into sections having a predefined length, and subsequently drying the cut hollow fiber membranes.

The apparatus of the present disclosure comprises a picker arm having a plurality of grooves configured to hold a hollow fiber membrane. The picker arm is configured to hold a plurality of hollow fiber membranes having an outer diameter which is larger than 3 mm and smaller than 4.5 mm.

The number of grooves in the picker arm can vary. In one embodiment, the picker arm comprises at least two grooves, for instance, 2 to 12 grooves, or 4 to 10 hollow grooves, or even 5 to 8 grooves. In exemplary embodiments shown in the accompanying figures, the picker arm is equipped with eight or six grooves, respectively, for carrying hollow fiber membranes.

The grooves of the picker arm are in fluid connection with a suction device, e.g., a vacuum pump. The reduced pressure attaches the hollow fiber membranes to the grooves of the picker arm. In one embodiment, elongated depressions which also are in fluid connection with the suction device are present in the grooves to increase the effect of the reduced pressure on the wall of the hollow fiber membrane, thereby increasing the force holding the hollow fiber membrane in position. In another embodiment, several small bores in fluid connection with the suction device are present in each groove.

The picker arm is mounted on a movable block and can be rotated around its longitudinal axis, around a horizontal axis of the moveable block which is perpendicular to the longitudinal axis of the picker arm, and moved in vertical direction with the moveable block.

The apparatus of the present disclosure also comprises a slide moveable in horizontal direction, i.e., parallel to the horizontal axis of the moveable block. The slide is configured to receive a fiber cartridge holding a plurality of hollow fiber membranes arranged in parallel and oriented in a direction perpendicular to the direction of movement of the slide. In one embodiment, bolts are present on the moveable slide which ensure a defined position of the fiber cartridge.

A controlled combination of all these movements allows the picker arm to pick up the fibers from the fiber cartridge and to arrange them in the grooves on the picker arm.

The apparatus of the present disclosure also comprises at least one heated metal pin having a conical shape, the maximum diameter of the heated metal pin being larger than the inner diameter of the hollow fiber membranes. In one embodiment, the at least one heated metal pin is covered with a non-stick coating. In one embodiment, the number of heated metal pins is equal to the number of fibers, i.e., the number of grooves on the picker arm. The at least one heated metal pin is moveable in a vertical direction and, optionally, in a horizontal direction.

In one embodiment, the apparatus comprises two sets of heated metal pins having a conical shape, the maximum diameter of the heated metal pins being larger than the inner diameter of the hollow fiber membranes, each of the sets comprising at least one heated metal pin. In a further embodiment, each set comprises a number of heated metal pins equal to the number of fibers. The two sets are configured to be used alternatively. In one embodiment, one set of heated metal pins is configured to be used for widening the ends of the hollow fiber membranes, and the other set of heated metal pins is configured to be used for widening the ends of the hollow fiber membranes to the walls of the bores in the disc of thermoplastic material. Each of the two sets of heated metal pins is moveable in a vertical direction and in a horizontal direction. The pins can be positioned above the hollow fiber membranes by moving them in horizontal direction.

The present invention also provides a process for manufacturing a filter element using the apparatus of the present disclosure.

The process involves mounting a fiber cartridge comprising a plurality of hollow fiber membranes having an outer diameter which is larger than 3 mm and smaller than 4.5 mm on the moveable slide of the apparatus, attaching the hollow fiber membranes from the fiber cartridge to the grooves of the picker arm, threading the hollow fiber membranes through bores of a disc comprised of a thermoplastic material, introducing heated conical pins into the ends of the hollow fiber membranes protruding from the disc, widening the ends of the hollow fiber membranes and subsequently pushing down the ends of the hollow fiber membranes and welding them to the wall of the bores of the disc.

In one embodiment of the process, the fibers are initially held in a closed fiber cartridge. The fiber cartridge is placed on the moveable slide of the apparatus of the present disclosure. In one embodiment, bolts are present on the moveable slide which ensure a defined position of the fiber cartridge.

The upper part of the cartridge is removed. To keep the fibers in position despite the removal of the upper part of the cartridge, vacuum is applied to the fibers through bores in the bottom part of the cartridge.

The hollow fiber membranes are removed from the cartridge by the picker arm one by one, and held in the grooves of the picker arm by applying vacuum. While the picker arm removes the fibers from the cartridge, the vacuum applied to the cartridge is disabled. The picker arm is rotatable around two axes and moveable in a vertical direction. The cartridge is also movable along a horizontal axis perpendicular to the longitudinal axis of the picker arm. A combination of these movements enables the picker arm to remove the fibers from the cartridge.

Then the hollow fiber membranes are threaded into the bores of a disc. The picker arm is configured to hold all the hollow fiber membranes present in the cartridge, and to transfer them into the bores of the disc in a single step. Once the picker arm has collected all the hollow fiber membranes from the cartridge, it turns into a vertical position and moves upwards. The upper end of the hollow fiber membranes is guided into the bores of a disc comprised of a thermoplastic material and the hollow fiber membranes are pushed upward through the bores until they protrude from the upper side of the disc.

An arrangement of heated metal pins moves downwards to widen the protruding ends of the hollow fiber membranes. In one embodiment, the number of metal pins is equal to the number of fibers. The pins have a conical shape, the diameter of the pins is slightly larger than the diameter of the hollow fiber membranes. The pins are covered with a non-stick coating. The temperature of the pins is lower than the melting temperature of the hollow fiber membranes. The hollow fiber membranes soften at the temperature of the pins and the upper end of the hollow fiber membranes is formed into a cone.

In the next step, an arrangement of heated pins welds the hollow fiber membranes to the disc. The pins are identical to the pins of the previous step. The temperature of the welding pins is higher than in the previous step and sufficient to melt the thermoplastic material of the disc. During the welding process, the hollow fiber membrane is pressed into the bore of the disc, i.e., downwards. Therefore, the vacuum of the picker arm is reduced, so that the fiber can slide along the picker arm without being damaged.

The same pins can be used for both, widening and welding. In one embodiment, there is a second set of welding pins to increase performance of the process. In another embodiment, only a single welding pin is used. A single pin transfers the heat directly to the welding area, while the rest of the disc and the hollow fiber membranes are unaffected. This effect can be used to prevent an undesired softening of the disc material in larger areas during the welding step which could lead to warping or deformation of the disk. This effect can be increased by a welding sequence wherein the hollow fiber membrane to be welded is as far away as possible from the previously welded hollow fiber membrane.

Exemplary embodiments of the apparatus and the process of the present disclosure are shown in the accompanying figures and are described below. It will be understood that the features mentioned above and those described hereinafter can be used not only in the combination specified but also in other combinations or on their own, without departing from the scope of the present invention.

FIG. 1 is a schematic longitudinal-sectional view of an embodiment of a picker arm 1 for picking up and transporting hollow fiber membranes. Grooves 2 for holding the hollow fiber membranes are present on the circumference of the picker arm 1. Connecting bores 3 connect the grooves 2 to a central bore 4 extending along the center axis of the picker arm 1. The central bore 4 can be connected to a suction device, such as a vacuum pump, via a first port 5 or a second port 6. If only one of the ports is used, the other one has to be closed with a plug.

Figure 2:
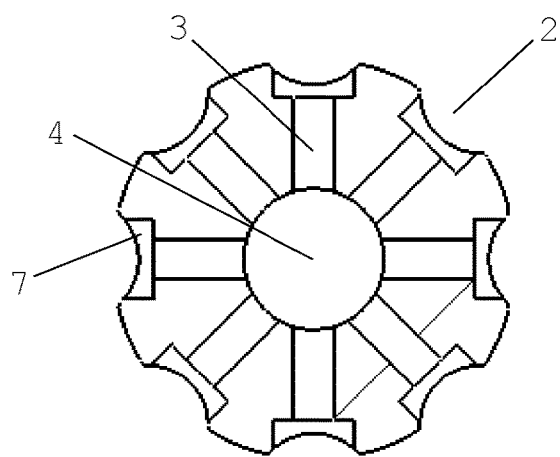
FIG. 2 is a cross-sectional partial view of the picker arm of FIG. 1.

FIG. 2 is a schematic cross-sectional partial view of the picker arm 1 of FIG. 1. Only the front part of the picker arm 1 is shown, not the base comprising the first port 5 and the second port 6. The central bore 4 is connected to the grooves 2 by connecting bores 3. Depressions 7 in the grooves 2 allow the vacuum to reach a larger portion of the surface of the fiber and increase the adhesion force.

The picker arm 1 can hold eight hollow fiber membranes around its circumference. Typically, the number of fibers on the picker arm matches the number of fibers present in the final product to be produced using the hollow fiber membranes, i.e., a sterilizing filter. Thus, a sterilizing filter unit can be produced using the fibers held by one picker arm. There can be picker arms holding more or less than eight fibers, as also shown in the following figures.

Figure 3:
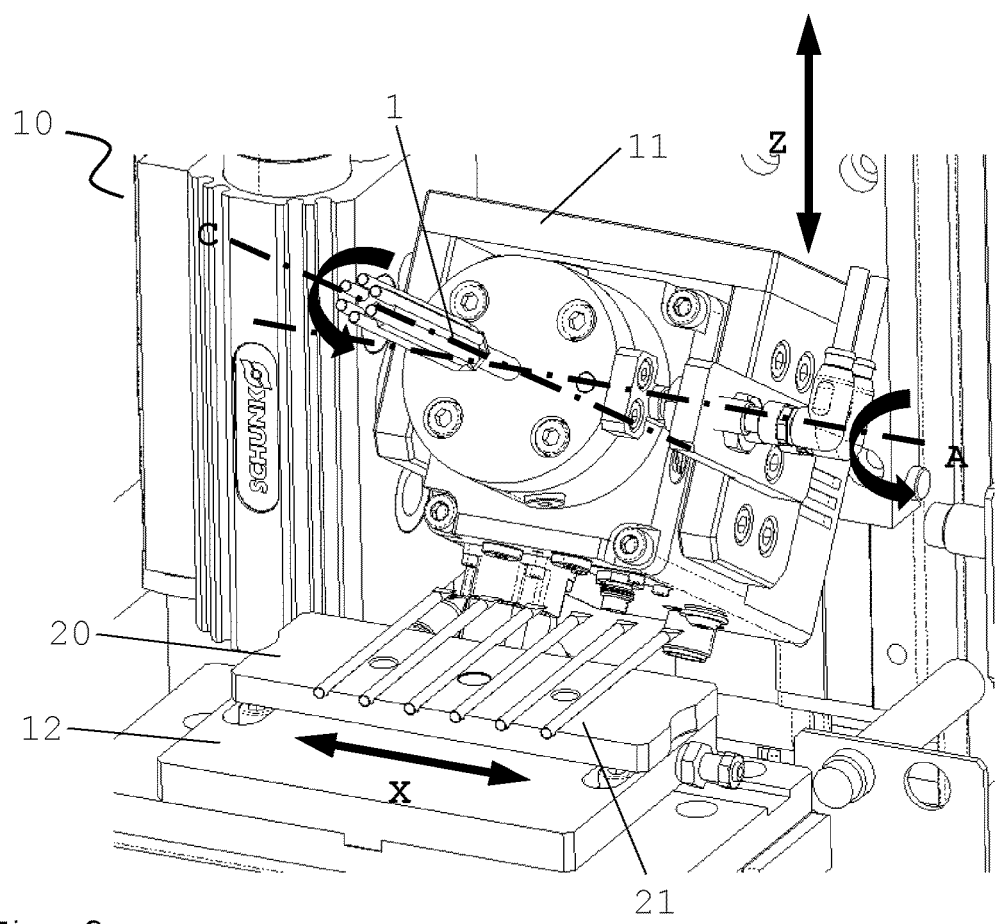
FIG. 3 is a schematic perspective view of an embodiment of the apparatus of the present disclosure in a first position.

FIG. 3 is a schematic perspective view of an embodiment of the apparatus 10 of the present disclosure in a first position. The figure shows the arrangement of the picker arm 1 on the apparatus 10. The picker arm 1 is mounted on a moveable block 11 and can rotate around its longitudinal axis C, swing between a vertical and a horizontal position around axis A of the moveable block 11, and moved up and down along axis Z with the moveable block 11. The apparatus also comprises a slide 12 that holds a fiber cartridge 20. The slide 12 can move along axis X. A controlled combination of all these movements allows the picker arm 1 to pick up the fibers 21 from the cartridge 20 and attach them around its circumference.

Figure 4:
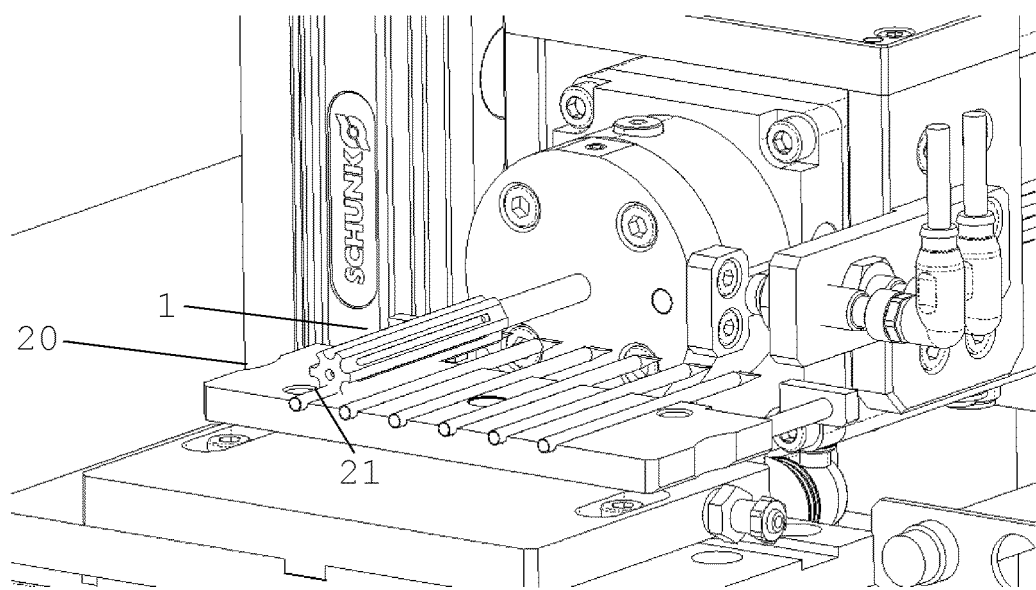
FIG. 4 is a schematic perspective view of the apparatus of FIG. 3 in a second position.

FIG. 4 is a schematic perspective view of the apparatus 10 of FIG. 3 in a second position where the picker arm 1 is in a horizontal position above the first fiber 21 in the fiber cartridge 20. The vacuum fastening the fibers 21 in the fiber cartridge 20 is disabled and strong vacuum is applied to the picker arm 1.

FIG. 5 is a schematic perspective view of the apparatus 10 of FIG. 3 in a third position where the picker arm 1 is in a vertical position. The picker arm has already moved upwards (along axis Z) and inserted the fibers 21 into a disc 22 comprised of thermoplastic material. Widening pins 13 are in contact with the fibers 21. The heat is stored in a massive heater block 14. The complete arrangement of widening pins 13 can move up and down along axis Z1. If there is a separate welding unit (to increase the productivity), the widening pins 13 and the welding unit have to be movable along axis X1.

FIG. 6 shows a picker arm 1 of an embodiment of the apparatus 10 of the present disclosure in several stages of the process of the present disclosure. Picture a) shows the picker arm 1 without hollow fiber membranes 21. The picker arm 1 can feature several small bores 8 in the grooves 2 instead of a depression 7 as shown in FIG. 2. The surface of the picker arm 1 has to be extremely smooth, to avoid any damage of the sensitive fibers 21. Picture b) shows the picker arm 1 with one attached fiber 21. Picture c) shows the picker arm 1 completely fit with fibers 21. In this case the picker arm 1 holds five fibers. Picture d) shows the picker arm 1 completely assembled with fibers 21 and a disc 22 comprised of thermoplastic material. The fibers 21 protrude from the disc 22 by several millimeters. In picture e), a widening unit comprising widening pins 13 is in contact with the fibers 21. The vacuum of the picker arm 1 is working at full strength to prevent displacement of the fibers 21. Picture f) is a detail view of picture e) and shows the cone formed by the widening pins 13 on the part of the fibers 21 protruding from the disc 22. The size of the formed cone is important for the welding process. If the cone does not exist or is too small, the fiber 21 cannot be welded correctly into the disc 22, as the fiber 21 would slip into the bores of the disc 22. If the cone is too large, there a part of the fiber would remain above the disc 22 and protrude from it. After the heat sealing process, the fiber 21 should be flush with the disc 22. Picture g) shows the step of welding the fibers 21 to the disc 22. The welding needs higher temperature than the widening. It can be performed with the widening pins 13 or with separate welding pins, as the geometry and surface coating of both types of pins is identical. The welding can be performed in one step with a complete set of welding pins or it performed in several steps using a single welding pin or a subset of welding pins, depending of the mass and material of the fibers 21 and the disc 22. During the welding process, the fiber 21 is pressed downwards into the disc 22. Therefore, the vacuum of the picker arm 1 is reduced, so that the fiber 21 can slide along the picker arm 1 without being damaged. Picture h) shows a detail view of the filter element 30 after the welding step. The fibers 21 are tightly connected to the disc 22 and the fibers 21 are flush with the disc 22.

LIST OF REFERENCE SIGNS 1 picker arm
2 groove
3 connecting bore
4 central bore
5 first vacuum port
6 second vacuum port
7 depression
8 small bore
10 apparatus
11 moveable block
12 slide
13 widening pins/welding pins
14 heater block
20 fiber cartridge
21 hollow fiber membrane
22 disc comprised of thermoplastic material
30 filter element

The invention claimed is:

1. An apparatus for producing a filter element, comprising a picker arm having a plurality of grooves, wherein each groove is configured to hold a hollow fiber membrane having an outer diameter which is larger than 3 mm and smaller than 4.5 mm, and being in fluid connection with a suction device;

wherein the picker arm being mounted on a moveable block and being rotatable around its longitudinal axis (C), around a horizontal axis (A) of the moveable block which is perpendicular to the longitudinal axis (C) of the picker arm, and moved in a vertical direction (Z) with the moveable block;

a slide moveable in a horizontal direction (X) and being configured to receive a fiber cartridge holding a plurality of hollow fiber membranes having an outer diameter which is larger than 3 mm and smaller than 4.5 mm arranged in parallel and oriented in a direction perpendicular to the horizontal direction (X);

at least one heated metal pin having a conical shape, the maximum diameter of the heated metal pin being larger than an inner diameter of the hollow fiber membranes, the least one heated metal pin moveable in a vertical direction (Z1) and, optionally, in a horizontal direction (XI).

2. The apparatus of claim 1, comprising two sets of heated metal pins having a conical shape, the maximum diameter of the heated metal pins being larger than the inner diameter of the hollow fiber membranes, each of the sets comprising at least one heated metal pin.

3. The apparatus of claim 2, wherein each of the two sets of heated metal pins is moveable in a vertical direction (Z1) and in a horizontal direction (XI).

4. The apparatus of claim 1, wherein the number of grooves on the picker arm is in the range of from 5 to 8.

5. The apparatus of claim 1, wherein each groove of the picker arm features an elongated depression.

6. The apparatus of claim 1, wherein each groove of the picker arm features a plurality of small bores in fluid connection with the suction device.

7. The apparatus of claim 1, wherein the slide is configured to receive a fiber cartridge holding a number of hollow fiber membranes which is in the range of from 5 to 8.

8. The apparatus of claim 1, wherein bolts are present on the moveable slide which are configured to interact with the fiber cartridge and ensure a defined position of the fiber cartridge on the moveable slide.

9. The apparatus of claim 1, wherein the at least one heated metal pin is covered with a non-stick coating.

10. The apparatus of claim 1, wherein the number of heated metal pins is equal to the number of grooves on the picker arm.

11. A process for the production of a filter element, comprising mounting a fiber cartridge comprising a plurality of hollow fiber membranes having an outer diameter which is larger than 3 mm and smaller than 4.5 mm on the moveable slide of the apparatus of claim 1, attaching the hollow fiber membranes from the fiber cartridge to the grooves of the picker arm of the apparatus of claim 1, threading the hollow fiber membranes through bores of a disc comprised of a thermoplastic material, introducing at least one heated metal pin of the apparatus of claim 1 into ends of the hollow fiber membranes protruding from the disc, widening the ends of the hollow fiber membranes and subsequently pushing the ends of the hollow fiber membranes into the bores of the disc and welding them to the wall of the bores of the disc.

12. The process of claim 11, wherein different heated metal pins are used for widening the ends of the hollow fiber membranes and for pushing the ends of the hollow fiber membranes into the bores of the disc and welding them to the wall of the bores of the disc.

13. The process of claim 11, wherein a single heated metal pin is used in sequence for widening the end of every hollow fiber membrane and for pushing the end of the hollow fiber membrane into the corresponding bore of the disc and welding it to the wall of the bore of the disc.

14. The process of claim 11, wherein the hollow fiber membranes comprise at least one polyethersulfone (PESU) and at least one polyvinyl pyrrolidone (PVP).

15. The process of claim 11, wherein the hollow fiber membranes additionally comprise a polymer bearing cationic charges.

* * * * *